United States Patent [19]
Weiler

[11] 3,947,954
[45] Apr. 6, 1976

[54] METHOD OF AFFIXING AND SECURING A RADIO TO A MOTORCYCLE

[76] Inventor: Harry H. Weiler, 907 W. 7th St., Plainfield, N.J. 07063

[22] Filed: June 25, 1974

[21] Appl. No.: 483,075

[52] U.S. Cl. .............. 29/592; 29/428; 280/289; 296/37 R; 224/29 R; 224/32 R; 70/233; 70/258
[51] Int. Cl.² .................. B62J 9/00; B62J 11/00
[58] Field of Search ...... 29/150, 592, 428; 179/156, 179/178, 179, 182; 312/7 R; 2/3 R, 6; 224/25 R, 25 G, 25 H, 30, 32, 37, 38, 39, 40, 42.42 R, 42.42 A, 42.45 R, 42.45 B; 211/4, 5; 248/27, 200, 203, 205 R, 226 R, 309, 311; 280/289, 202; 296/3, 37 R; 70/58, 63, 158, 160, 233, 258; D2/231; D12/126, 115, 117; D56/413

[56] References Cited
UNITED STATES PATENTS

| | | | |
|---|---|---|---|
| 2,091,682 | 8/1937 | Harley | 280/289 |
| 2,588,671 | 3/1952 | Tringali | 224/30 R |
| 2,619,639 | 12/1952 | Hendler | 179/156 A |
| 2,942,072 | 6/1960 | Cunningham | 179/156 R |
| 3,088,002 | 4/1963 | Heisig | 179/156 R |
| 3,586,977 | 6/1971 | Lustig et al. | 2/3 R X |
| 3,625,405 | 12/1971 | Kezar et al. | 280/202 X |
| 3,673,828 | 7/1972 | Jones | 70/58 |
| 3,765,375 | 10/1973 | Young | 280/202 X |

FOREIGN PATENTS OR APPLICATIONS
521,070  3/1955  Italy .................................. 280/289

OTHER PUBLICATIONS
"New Models & Products," p. 104, *Cycle World*, May, 1970.

*Primary Examiner*—C. W. Lanham
*Assistant Examiner*—Dan C. Crane

[57] ABSTRACT

This invention relates to affixing and securing against theft, a radio (AM, FM, FM Stereo, Tape Player or any combination(s) thereof) or the essential circuitry thereof to a motorcycle and encompasses the optional placement of one or more headphone(s) within the protective helmet.

11 Claims, 2 Drawing Figures

METHOD OF AFFIXING AND SECURING A RADIO TO A MOTORCYCLE

A purpose of the invention is to provide a radio or the essential circuitry thereof which is easily attached to or removed from a motorcycle.

A further purpose of the invention is to secure such radio or essential circuitry thereof against theft.

A further purpose is to provide a radio or the essential circuitry thereof which is affixed to a motorcycle in such fashion as not to interfere with or inhibit the safe operation of a motorcycle.

A further purpose is to provide a radio or the essential circuitry thereof for attchment to a motorcyle which is so located as to be readily and conveniently operable by the rider and subject to minimal vibration.

A further purpose is to provide a means to mitigate the interference with reception of the engine noise of a motorcycle.

Further purposes appear within the specifications and claims.

In the prior art, a radio for attachment to handlebars is well known. In the case of a motorcycle, a radio so attached tends to not only place additional weight on the front wheel, it being the steering mechanism, thereby posing a potential safety hazard, but subjects the radio to excessive vibration. Additionally, since many modern motorcycles' speedometers and gauges are placed directly behind and slightly above the handlebar, the attachment of a radio to the handlebar would tend to interfere with their visibility.

Mounting a radio on the handlebar of a motorcycle, or on any other external part thereof also poses a theft problem. Whereas various devices for locking radios in automobiles are known, to apply such to a motorcycle will require an intricate combination of brackets, clamps, holes, nuts and bolts.

The present invention contemplates housing the radio within an enclosure which shall be affixed to the gasoline tank and secured there which is readily attached as well as removed; does not require brackets and clamps, nuts and bolts, special supports and specialized holes, nor any substantial change in the manufacture of the motorcycle.

The invention further contemplates that the said enclosure, so designed and apertured as to permit ready and convenient operation of the radio and attachment or detachment of any necessary or desired components, be a part of the the gasoline tank filler seal, or vice versa, and that the mechanical means for securing the enclosure to the filler opening, or removing it therefrom be contained within and accessible within the enclosure; the radio and mechanism by which the housing is secured to the motorcycle being protected from theft by virtue of the cover of the housing being locked onto the base thereof.

Referring to the drawings.

Figure 1:
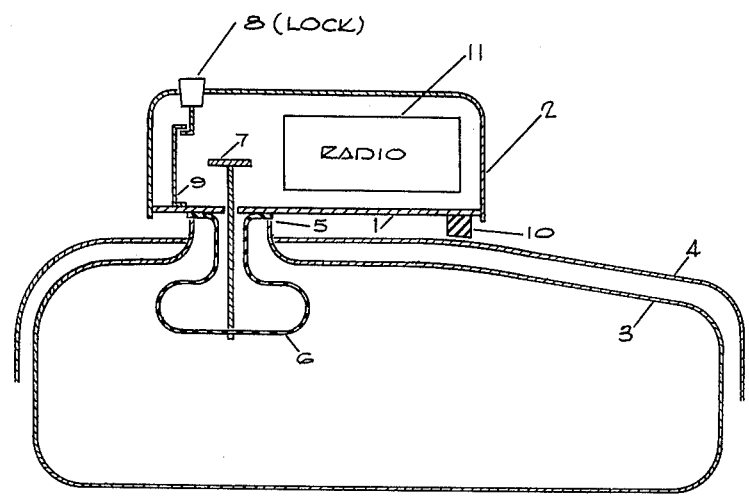
FIG. 1 is a sectional view of the front portion of a motorcycle gasoline tank and depicts the radio housing, affixed to the said tank as were the case where the seal to the tank had been removed and discarded.
Figure 2:
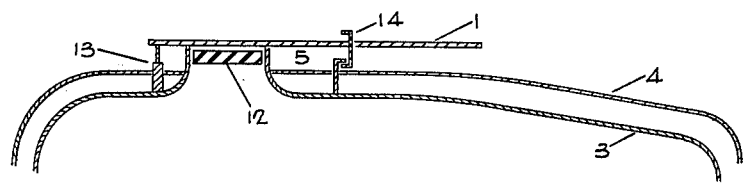
FIG. 2 is a sectional view of the area of the gasoline tank filler opening, depicting how the base of the radio housing is attached where it replaces a hinged gasoline tank closure common to many motorcycles.

Describing FIG. 1, 1 represents the base of the radio housing; 2 the cover thereto; 3 the gasoline tank; 4 the outer shell, common to many motorcycle gasoline tanks; 5 the tank filler opening; 6 an expandable rubber or rubber-like plug, shown in the semi-expanded position, of the type manufactured by the Moeller Mfg. Co., Inc., Greenville, Miss., 7 the mechanical means by which the plug is expanded or contracted; 8 the lock serving to secure the cover 2 to the base 1 at 9, a bracket, affixed to 1. 10 represents a stabilization means, affixed to 1; 11 represents the radio, adjacent to the base 1.

Describing FIG. 3, 1 is the base of the housing; 3 the gasoline tank; 4 the outer shell, common to many motorcycle gasoline tanks; 5 the tank filler opening; 12 a seal common to the type used in conjunction with hinged motorcycle gasoline tank closures, which seal is affixed to 1, the base, which is hinged to the bracket 13 common to motorcycle gasoline tanks where a hinged closure is utilized, and secured via a latch at 14, provision therefor also being common to motorcycles utilizing a hinged tank closure.

The drawings and representations made therein are examples of the nature of the radio housing and components thereof, as well as examples of methods of affixing the said housing to the filler opening of the gasoline tank and are not intended nor to be construed as the sole examples of executing the intent and purpose of the invention. The radio is randomly depicted and situated, without restriction or limitation thereto.

Having thus described my invention, what I claim as new and desire to secure by Letters of Patent is:

1. The process of mounting and securing against theft a radio, stereo tape player, circuitry or components thereof or the like on a motorcycle gasoline tank, comprising:
   a. affixing a base of a housing to said tank at the filler opening;
   b. placing said radio adjacent to said base;
   c. placing a cover over said base as to form a housing;
   d. securing said cover to said base by means of a lock.

2. The process of claim 1 wherein to said base is affixed a seal, forming a gasoline tank closure and base means, which said base means is hinged and latched to said gasoline tank at the periphery of said filler opening.

3. The process of claim 1 wherein a seal, removably insertable within and affixable to the periphery of said filler opening, is affixed to said base.

4. The process of claim 1 including affixing said radio to said base.

5. The process of claim 1 including affixing said radio to said cover.

6. An apparatus for mounting and securing against theft a radio, stereo tape player, circuitry or components thereof or the like to a motorcycle gasoline tank, comprising:
   a housing, comprising a cover and base which form an enclosure capable of containing said radio, said base including means to affix said enclosure to said gasoline tank at the filler opening;
   and lock means to lock said enclosure, whereby said radio will be protected against theft.

7. An apparatus of claim 6 wherein said affixing means further comprises a base to which is affixed a seal, forming a gasoline tank closure and base means, which said base means is hinged and latched to said gasoline tank at the periphery of said filler opening.

8. An apparatus of claim 6 wherein said affixing means further comprises a base to which is affixed a seal, removably insertable and affixable to the periphery of said filler opening.

9. The apparatus of claim 6 further comprising means to affix said radio to said base.

10. The apparatus of claim 6 further comprising means to affix said radio to said cover.

11. The apparatus of claim 6 further comprising means to house said radio in unaffixed fashion.

* * * * *